United States Patent [19]

Telkes

[11] 4,187,189

[45] Feb. 5, 1980

[54] PHASE CHANGE THERMAL STORAGE MATERIALS WITH CRUST FORMING STABILIZERS

[75] Inventor: Maria Telkes, Killeen, Tex.

[73] Assignee: American Technological University, Killeen, Tex.

[21] Appl. No.: 902,239

[22] Filed: May 2, 1978

[51] Int. Cl.$^2$ .......................... C09K 5/06; F24H 7/00
[52] U.S. Cl. ........................................ 252/70; 126/400
[58] Field of Search .......................... 252/70; 126/400; 165/104 S

[56] References Cited

U.S. PATENT DOCUMENTS

| | | | |
|---|---|---|---|
| 3,720,198 | 3/1973 | Laing et al. | 126/400 |
| 3,986,969 | 10/1976 | Telkes | 252/70 |
| 4,003,426 | 1/1977 | Best et al. | 252/70 X |

Primary Examiner—Harris A. Pitlick
Attorney, Agent, or Firm—Peter J. Murphy

[57] ABSTRACT

A body for the storage of heat or for the storage of coolness is, in its solid phase, a conglomerate of a mass of crystalline particles of a salt-hydrate, and a rigid cellular support structure in the form of a crust formed by a chemical reaction with the surfaces of the crystalline particles. By way of example, strontium nitrate is reacted with uniformly sized crystalline particles of sodium sulfate decahydrate to form an integral support crust structure of the compound strontium sulfate, which compound is insoluble in water. When the crystalline particles are transformed to the liquid phase, the liquid is confined within the cells of the support structure. The body is enclosed in a moisture impermeable skin to prevent evaporation of the water of crystallization in the liquid phase. Several methods of fabricating such a body are disclosed, including the mixing of the crystalline particles with a solution of soluble strontium nitrate in sufficient quantity to provide the desired supporting crust structure, pouring that mixture into a suitable mold, and providing the desired moisture impervious skin for the cast body.

37 Claims, No Drawings

PHASE CHANGE THERMAL STORAGE MATERIALS WITH CRUST FORMING STABILIZERS

BACKGROUND AND SUMMARY OF THE INVENTION

This invention relates to materials which utilize solar energy or ambient temperature change for the storage of thermal effects, either heat or cold, utilizing the heat of fusion of the material. The invention relates more particularly to a composition of a material, and a method for producing such material, in the form of self-supporting heat exchange bodies or elements for use as heat exchangers.

With the increasing concern in regard to the exhaustion of known sources of clean energy, principally gas and oil, considerable attention has been given to the use of solar energy, and much work has been done in regard to the design of solar energy systems having the capability to store heat developed from solar energy during times of sunlight for use at other times when the sunlight is not available.

The use of heat of fusion materials, for heat storage particularly, has gained increasing favor in recent times and has been the subject of study and experimentation to develop materials which are suitable for use in practical heat exchange systems. One factor in this endeavor is to discover and develop materials which are available in large quantities, which can be made available for use at a reasonable cost, and which can be prepared for the ultimate use as heat exchangers in a simple and economic manner. The achieving of these desirable ends is not without problems; and efforts of the present applicant to solve some of the problems are described in U.S. Pat. No. 2,677,664, issued May 4, 1954 and U.S. Pat. No. 3,986,969, issued Oct. 19, 1976.

The heat of fusion materials which are the subject of this invention, are also referred to as "phase change thermal storage materials." These materials store thermal effects by cyclic changes between the solid phase and the liquid phase, with the accompanying absorption or release of heat resulting from the heat of fusion effects. A suitable example of such material is sodium sulfate decahydrate (Glauber's salt).

One particular problem with these materials results from the fact that the density of the material in the solid phase is usually higher than the density of the material in the liquid phase; and during the transformation of the material from the solid to the liquid phase certain of the solid particles of higher density will tend to sink toward the bottom of containers filled with the partially molten material. This results in a condition known as thermal stratification, in that the top layers of a container become overheated while the bottom layer remains at a much lower temperature and may remain continuously in solid or frozen form. Eventually the bottom layer will not change to the liquid phase, when the container is exposed to the upper temperature of the system, and by the same token the upper layer may not change to the solid phase when the container is exposed to the lower temperature of the system. Obviously, the heat of fusion effect and the efficiency of the system is drastically reduced. The above mentioned Telkes U.S. Pat. No. 3,986,969 is concerned with one method for solving the thermal stratification problem, involving the use of a thickener so that the material has a gel-like structure in a liquid phase to minimize settling of heavier particles.

A practical problem with respect to the construction of heat exchangers involving these heat of fusion materials, is that the material is not self-supporting while in its liquid phase; that is the material has no "load bearing mechanical strength." This means that the heat exchange assembly must be designed in a manner to provide structural support, as well as confinement, for the material when in its liquid phase. The material is, of course, self-supporting when it is in its solid or frozen phase.

The design of heat exchange assemblies would be vastly simplified, as a practical matter, if the desired phase change thermal storage material could be produced in the form of self-supporting or loading bearing unitary bodies, which bodies could be formed or cast in different shapes and sizes such as in the form of bricks or in the form of panels, for example.

Some experimentaton has been done to produce "solid building units" for heat exchange assemblies. One attempt involved the use of a porous concrete structure and utilizing vacuum methods to force a liquid phase thermal storage material into the pores. This has a disadvantage that the produced heat exchange bodies are relativey heavy; and at best only about half of such bodies are available to be filled with the heat exchange material. Another proposed method has been to enclose thickened heat exchange material in plastic bags and surround these with plastic concrete to form brick-like blocks. Disadvantages of this method are, again, the weight of the blocks and the fact that the heat exchange material would likely occupy not more than fifty percent of the volume.

Encapsulation has been attempted using relatively expensive plastic capsules to produce "microencapsulation," but because of relatively high costs this approach is not economically acceptable.

A general object of this invention is to provide heat of fusion materials which obviate the problems of thermal stratification and the lack of load bearing mechanical strength which are discussed above.

A more particular object of this invention is to provide heat of fusion materials which can be cast or formed into a rigid self-supporting body of desired configuration, and which will maintain that rigid body configuration in both the solid and liquid phases.

Another object of this invention is to provide a method for the fabrication of such heat of fusion materials in a rigid body form.

Another more particular object of this invention is to provide heat of fusion materials which include a rigid support structure, providing relatively small cells enclosing individual crystalline particles of the material thereby minimizing thermal stratification.

A further object of this invention is to provide a method for producing heat of fusion materials with the rigid cellular support structure.

Still another object of this invention is to provide a method for producing heat of fusion materials which may be cast in suitable forms to provide bodies of desired configuration, and which bodies will maintain the rigid self-supporting configuration in both the solid and liquid phases of a material.

These objects are accomplished in a body for the storage and release of thermal effects, utilizing the heat of fusion of a material forming body, consisting of: a mass of separate crystalline particles of a salt-hydrate;

and a rigid, integral support structure for the mass of particles, formed by a water insoluble solid filling the voids between the particles and enclosing each particle. The particles and the support structure define a rigid, self-supporting conglomerate structure, which structure remains rigid and self-supporting for both the solid phase and the liquid phase of the salt-hydrate. More particularly, the body includes means providing a water impermeable skin completely enclosing that conglomerate structure.

The objects are accomplished, also, in a method for fabricating a heat exchange body, including a heat of fusion material, comprising the steps: preparing a mass of crystalline particles of a salt-hydrate to a generally uniform size; preparing a crust forming compound, chosen to react chemically with the crystalline particles to form a water insoluble crust surrounding each particle; thoroughly mixing the salt-hydrate particles and the crust forming compound to form a homogeneous mixture; pouring the mixture into a suitable form, and allowing the mixture to set in the form whereby the crust forming compound reacts chemically with the particles to form an integral, rigid, water insoluble crust structure surrounding each of the particles and defining an integral, cellular, support structure for said particles. More particularly, the method comprises enclosng the body with a moisture impermeable outer skin.

More particularly, the mass of crystalline particles is prepared from salt-hydrate selected from a group consisting of the chlorides, nitrates, sulfates, phosphates, and carbonates, respectively, of sodium, potassium, magnesium, aluminum, and iron; and the crust forming compound is prepared from a compound selected from a group consisting of the chlorides, nitrates, oxides, and hydroxides, respectively, of calcium, strontium and barium.

The novel features of the invention, as well as additional objects thereof, will be understood more fully from the following description.

DESCRIPTION OF THE PREFERRED EMBODIMENTS

A preferred heat of fusion material, for use with this invention, is sodium sulfate decahydrate; and this is preferred for reasons that it is available in large quantities at low cost, it has a high heat of fusion and a desirable melting point range, and it is easy to handle. Other preferred characteristics of this and other materials, are that they should be nontoxic, nonflammable, noncombustible, and noncorrosive. The lowest cost materials for use are large volume chemicals based on compounds of sodium, potassium, magnesium, alluminum and iron. Preferably, the materials are in the form of salt-hydrates and their eutectics. Types of such low cost compounds are chlorides, nitrates, sulfates, phosphates and carbonates. The following table identifies certain properties of selected suitable salt-hydrates.

| | Chemical Compound | Melting Point, °F. | Heat of Fusion BTU per Pound | Density lb/ft³ |
|---|---|---|---|---|
| Sodium sulfate decahydrate | $Na_2SO_4 10H_2O$ | 88–90 | 108 | 97 |
| Calcium chloride hexahydrate | $CaCl_2 6H_2O$ | 84–102 | 75 | 102 |
| Sodium carbonate decahydrate | $Na_2CO_3 10H_2O$ | 90–97 | 106 | 90 |
| Disodium phosphate dodecahydrate | $Na_2HPO_4 12H_2O$ | 97 | 114 | 95 |
| Calcium nitrate tetrahydrate | $Ca(NO_3)_2 4H_2O$ | 102–108 | 60 | 114 |
| Sodium thiosulfate pentahydrate | $Na_2S_2O_3 5H_2O$ | 118–120 | 90 | 104 |
| Magnesium chloride hexahydrate | $MgCl_2 6H_2O$ | 240 | 41 | 110 |

Using sodium sulfate decahydrate as a preferred example of a heat of fusion material for use in the invention, a preferred form of heat exchange body according to the invention, in the solid phase, consists of a conglomerate of a mass of crystalline particles of sodium sulfate decahydrate and a rigid, integral support structure which provides individual closed cells or pockets for each crystalline particle. This support structure is an integrated structure which maintains its ridigity when the heat of fusion material changes to the liquid phase; so that the body functions as a rigid body in both the solid and liquid phases of the heat of fusion material. The cellular support structure has the form of a crust which has been formed chemically by reaction of a suitable crust forming compound with the particles of sodium sulfate decahydrate. The crust forming compound is a chemical compound, which reacts with the surfaces of the particles of sodium sulfate decahydrate to form a crust of a water insoluble compound. The crust completely surrounds each of the particles and also fills the voids between the particles, to form the integral, cellular support structure.

Examples of materials which may be suitable as crust forming materials are chlorides, nitrates, oxides, and hydroxides of calcium, strontium and barium. By way of example, a suitable crust forming material for use with sodium sulfate decahydrate is strontium nitrate $(Sr(NO_3)_2)$. This, when reacted with sodium sulfate decahydfate, forms a solid crust of the compound strontium sulfate $(SrSO_4)$ which is insoluble in water, and water soluble sodium nitrate $(NaNO_3)$. The reaction which takes place may be described as follows:

$Na_2SO_4.10H_2O + Sr(NO_3)_2 + $ water changes to

$SrSO_4 + 2NaNO_3 + $ water.

Another example of a crust forming material for use with sodium sulfate decahydrate is strontium hydroxide. The reaction which takes place may be described as follows:

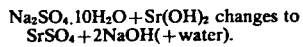
$Na_2SO_4.10H_2O + Sr(OH)_2$ changes to
$SrSO_4 + 2NaOH(+$water$)$.

Another example of suitable materials is the use of magnesium hydroxide as a crust forming material reacted with the salt-hydrate magnesium chloride hexahydrate, to form magnesium oxychloride, a very tough crust. The reaction which takes place may be described as follows:

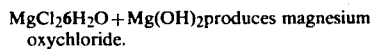
$MgCl_2 6H_2O + Mg(OH)_2$ produces magnesium oxychloride.

Still another example of suitable materials is the use of a calcium compound as the crust compound, reacted with the salt hydrate disodium phosphate dodecahydrate to form a support crust of calcium phosphate.

The support crust structure need only have sufficient mechanical strength to maintain the rigid condiguration of the formed body, when the heat of fusion material is in the liquid phase. It is desired, of course, that the percentage by volume of the support structure be minimal to provide a heat exchange body of maximum efficiency; that is that the body contain the maximum possible amount of heat of fusion material, in relation to the overall body volume.

Although it is recognized that most crystalline particles will not be cube-shaped, for the purpose of illustration and analysis it is assumed that a crystalline particle may be cube-shaped, and 0.1 inch on an edge. References, in this specification, to crystalline particles of about 0.1 inch size, means particles equivalent in size to a cube-shaped particle being 0.1 inch on an edge. It is further assumed that for crystalline particles of this size, a crust having a thickness of about 0.001 inch (1/100 of the particle edge dimension), will have the desired structural strength. Using the symbol E for the edge dimension of a crystalline particle, the volume of such crystalline particle is $E^3$. Considering that the particles in a body are a mass of contiguous or adjacent particles (where support crust surfaces are shared by adjacent crystals), the amount of crust surface required for each crystalline particle is only one-half the total crust surface, or $3E^2$. Using the symbol D for the thickness of the crust structure between adjacent crystals, the formula for the volume of the crust for each crystalline particle in a mass of crystals is: $V(crust) = 3E^2 \times D$. Returning to the assumption that a crust thickness of 0.001 inch is sufficient for a particle having a 0.1 inch edge, the resultant relationship is that $D = E/100$. We find that the volume of the crust then is $3E^2 \times E/100$ or $0.03E^3$, which is 3% of the total volume ($E^3$) of the crystalline particle. From this analysis, it will be seen that 97% of the conglomerate body structure is made up of the heat of fusion material; and accordingly the body produced is a very efficient heat exchange body. This analysis applies for bodies having crystalline particle sizes in the preferred range: 0.05 to 0.20 inch.

It may be desirable that the heat of fusion material of the heat exchange body include a nucleating agent which functions as a crystallization promoter. This assures that crystallization occurs at the desired temperature, when the heat of fusion material changes from the liquid phase to the solid phase. Such a nucleating agent may consist of about 3% by weight of borax uniformly mixed with the sodium sulfate decahydrate.

Another structural feature necessary to such heat exchange body is that it must include an outer skin which is impermeable to moisture. Since the described support crust is likely not impermeable to moisture, evaporation of water from the outer surface portions of the body could occur during the liquid phase of the body, resulting in rapid deterioration of the heat of fusion effect of the body. The outer skin may have any desired form. One preferred form is a thin walled elastic container, which may be the mold into which the material is poured to cast or form the body. Another form is a plastic liner for a mold. The skin need not provide any support function.

METHODS OF MANUFACTURE

One method of preparing a heat exchange body will now be described with reference to the salt-hydrate sodium sulfate decahydrate and to a crust forming compound strontium nitrate. First a desired quantity of crystalline particles of sodium sulfate decahydrate is prepared or accumulated, which particles have a generally uniform particle size preferably less than 0.1 inch on an edge. A preferred range of particle size is from 0.05 inch to 0.20 inch. These crystalline particles may be prepared by the grinding up of larger crystalline masses, or by crystal generation techniques. The indicated particle size has been selected for the reason that tests have indicated that the above mentioned thermal stratification is negligible if the size of the crystalline particles is smaller than approximately 0.1 inch. A saturated solution of strontium nitrate is then prepared, this compound being soluble in water. This saturated solution should be prepared with slight excess water, not more than 2% of the additive solution. The solution of the crust forming compound is then thoroughly mixed with the particles, with the amount of the solution being sufficient to coat or wet each of the particles in sufficient quantity to form the desired crust, surrounding each particle. The reaction that then takes place has been described above.

The mixture is then poured into a suitable mold, and allowed to set for a suitable period and under suitable conditions for the chemical reaction to occur. Once the support crust is formed, the crust material becomes permanently hardened. After the setting is completed, if the mixture has been poured into reusable molds the bodies are removed from the molds and a suitable form of moisture impermeable skin applied to the outer surface of the body. This may be in the form of a suitable plastic skin or plastic coating, secured or sealed to the body in any suitable manner. One method may be to provide a suitable plastic container as the mold, which container is thin walled but sufficiently firm to provide the desired support during the casting, and which is then sealed to define the moisture impermeable outer skin. A variation of this, where greater support is required for the casting, is to provide a thin walled plastic liner for a mold which liner seals the cast mixture; and the plastic encased body is then removed from the mold after the setting of the mixture.

When the crust forming compound is a chloride or a nitrate, a chloride or nitrate compound then becomes part of the body and this may be undesirable. To obviate this, the crust forming compound may have the form of an oxide or a hydroxide introduced as a slurry of fine powder for example. Using strontium hydroxide as an example of the crust forming compound, the reaction that takes place may be described as follows:

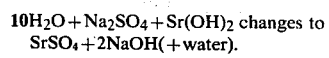

$10H_2O + Na_2SO_4 + Sr(OH)_2$ changes to $SrSO_4 + 2NaOH (+water)$.

In this reaction, sodium hydroxide is formed, introducing an alkaline reaction; and this can be prevented by adding some dilute sulfuric acid to neutralize the sodium hydroxide.

Another method for preparation of a heat exchange body utilizes a crust forming compound not in solution; and accordingly the crust forming compound may be one not soluble in water. This method involves the preparation of crystalline particles of sodium sulfate decahydrate, for example, in the manner previously described; and then mixing these particles with a film forming oil, such as oleic acid or other fatty acid. The oil should be added in sufficient quantity to form a very thin oil film around each of the crystalline particles. A crust forming compound in the form of a dry powder of a hydroxide of calcium, strontium or barium, for example, is then mixed thoroughly with the crystalline particles. The quantity of crust forming compound is sufficient to react with all of the surfaces of the particles. This mixture is then poured into a mold as described previously; and a slow reaction of the crust forming compound with the crystal particles will occur through the oily film. The oily film enables the thorough mixing of the solid particles to a homogeneous mass prior to casting, and slows or prevents the reaction of the materials until the mixture can be poured into the mold. During the reaction process, the oil such as oleic acid or other fatty acid may change into a sodium oleate (or stearate) mixed with the corresponding less soluble calcium, strontium or barium salts forming the crust supporting structure. Experiments have been conducted with such mixtures indicating that crust formation can be accelerated or delayed by using these methods. The body formed by this method requires an outer moisture impermeable skin which may be provided in the manner described.

Still another method of preparation of a body utilizing sodium sulfate decahydrate crystalline particles for example, involves the use of anhydrous sodium sulfate as the base ingredient. This method may result in considerable savings in shipping costs, where the heat of fusion material must be transported some distance from the source of supply to the point of manufacture, in that the weight and volume of the anhydrous material is substantially less than the weight and volume of the corresponding salt-hydrate. This method involves the addition of water, at the ponit of manufacture, to produce the crystalline particles of desired size. To illustrate this point, and also the method of manufacture, the following table of properties of the anhydrous salt and the salt-hydrate are considered:

|  | Weight % | Density g/cm$^3$ | Volume % | Volume ratio |
| --- | --- | --- | --- | --- |
| Na$_2$SO$_4$ | 44 | 2.66 | 16.5 | 1.0  0.24 |
|  |  |  |  | or |
| Na$_2$SO$_4$10H$_2$O | 100 | 1.46 | 68.5 | 4.15 1.0 |

This table identifies the relationships of the weight in volume of a selected amount of crystalline sodium sulfate decahydrate and the amount of anhydrous sodium sulfate required to form that salt-hydrate. It will be seen immediately that, from the standpoint of shipping costs, the weight of the equivalent amount of anhydrous sodium sulfate is only 44% of that of the salt-hydrate, and the corresponding volume is only 24%.

This method involves the use of anhydrous sodium sulfate in granular form, the granules being of a selected uniform size to produce the desired size of crystalline particles when recombined with the water of crystallization. In order to control the size of the formed crystalline particles, the granules are coated with a semi-impermeable film, prior to the mixing of the granules with the water in an amount just sufficient to form the salt-hydrate. The film must be a flexible stretchable film, such as may be produced by mixing granules with an oil such as oleic acid. When the oil coated sodium sulfate granules are mixed with the water, through an osmotic effect just sufficient water passes through the oil film around each granule to produce the equivalent crystalline particles; and the oil film therefore controls the size of the crystalline particles which are formed. For this transformation to occur, the temperature of the mixture must be maintained below 90° F. (32° C.), the transformation temperature of sodium sulfate decahydrate.

After the crystalline particles are formed in the above manner, these particles are then mixed with a crust forming compound which may be in the form of a solution or slurry of the desired amount of compound. After thorough mixing, this mixture is poured into a suitable mold as previously described; and the crust forming compound will react with the surfaces of the crystalline particles through the oil film to produce the supporting crust structure. After the setting of the mixture to produce the heat exchange body, the body must be provided with a moisture impermeable outer skin as previously described.

With respect to the selection of the granule size for the anhydrous sodium sulfate in the above described method, let us again assume a desired crystalline particle size of a cube being 0.1 inch on edge and therefore having a volume of 0.001 inch$^3$. It will be apparent, from the above table, that the volume of the equivalent amount of anhydrous sodium sulfate is 24% of the crystalline volume or 0.00024 inch$^3$. Accordingly, that would be the selected size for the generally uniform particles of granular sodium sulfate and, as mentioned above, each granule would combine with the desired amount of water through the water permeable oil film to produce the desired sized crystalline particles of sodium sulfate decahydrate.

Generally, the chemical reactions forming the crust will occur more rapidly when the temperature of the materials is elevated, but maintained below the heat of fusion temperatures of the salt-hydrate.

It has been observed that heat exchange bodies formed in accordance with the present invention, wherein the crystals of the salt-hydrate are confined within cells of a crust support structure, have the same thermal conductivity as a structure of solid crystals. When the body is in the liquid phase, with the liquid material confined within the cells of the support structure, the thermal conductivity of the body is actually lower than that of the solid crystalline material.

What has been described are novel forms of heat exchange bodies, and methods for making such bodies, which bodies include a very large proportion of a heat of fusion material and are therefore very efficient heat exchange bodies. A particular feature of these bodies is that they are manufactured in the form of rigid self-supported bodies, which may be cast in any desired shape, and which can be used in the manner of other rigid heat storage bodies in the design of heat exchange assemblies or units. Such bodies remain in the rigid self-supporting form for both the solid phase and the liquid phase of the heat of fusion material contained therein.

While preferred embodiments of the invention have been illustrated and described, it will be understood by those skilled in the art that changes and modifications may be resorted to without departing from the spirit and scope of the invention.

What is claimed is:

1. A body for the storage and release of thermal effects, utilizing the heat of fusion of a material forming the body, consisting of
   a mass of separate crystalline particles of a salt-hydrate;
   a rigid, integral support structure for said mass of particles, formed by a water-insoluble solid filling the voids between said particles and enclosing each particle; said support structure consisting of a crust structure formed by a chemical reaction of a crust-forming compound with the surfaces of said crystalline particles;
   said particles and said support structure defining a rigid, self-supporting conglomerate structure; said conglomerate structure remaining rigid and self-supporting for both the solid phase and the liquid phase of said salt-hydrate;
   and means providing a water impermeable outer skin for said conglomerate structure.

2. A body as set forth in claim 1, further consisting of a plastic skin completely enclosing said conglomerate structure, providing said water impermeable outer skin.

3. A body as set forth in claim 1, further consisting of said crystalline particles being of generally uniform size; and the size of said particles being in the range of 0.05 inch to 0.20 inch.

4. A body as set forth in claim 3, further consisting of the size of said particles being about 0.10 inch.

5. A body as set forth in claim 1, further consisting of said salt-hydrate being selected from a group consisting of the chlorides, nitrates, sulfates, phosphates, and carbonates, respectively, of sodium, potassium, magnesium, aluminum, and iron.

6. A body as set forth in claim 5, further consisting of said salt-hydrate being selected from a group consisting of sodium sulfate decahydrate, calcium chloride hexahydrate, sodium carbonate decahydrate, disodium phosphate dodecahydrate, calcium nitrate tetrahydrate, sodium thiosulfate pentahydrate, and magnesium chloride hexahydrate.

7. A body as set forth in claim 1, further consisting of said crust forming compound being a compound of a metal selected from a group consisting of calcium, strontium and barium.

8. A body as set forth in claim 7, further consisting of said crust forming compound being selected from a group consisting of calcium chloride, strontium chloride, barium chloride, calcium nitrate, strontium nitrate and barium nitrate.

9. A body as set forth in claim 7, further consisting of said crust forming compound being selected from a group consisting of calcium hydroxide, strontium hydroxide, barium hydroxide, calcium oxide, strontium oxide and barium oxide.

10. A body as set forth in claim 1, further consisting of said salt-hydrate consisting of sodium sulfate decahydrate; and said support structure consisting of the reaction compound strontium sulfate, formed from the reaction of strontium nitrate with the surfaces of said particles.

11. A body as set forth in claim 1, further consisting of said salt-hydrate consisting of sodium sulfate decahydrate; and said support structure consisting of the reaction product strontium sulfate, formed from the reaction of strontium hydroxide with the surfaces of said particles.

12. A body as set forth in claim 1, further consisting of said salt-hydrate consisting of magnesium chloride hexahydrate; and said support structure consisting of the reaction product magnesium oxychloride, formed from the reaction of magnesium hydroxide with the surfaces of said particles.

13. A body as set forth in claim 1, further consisting of said salt-hydrate consisting of disodium phosphate dodecahydrate; and said support structure consisting of the reaction product calcium phosphate, formed from the reaction of a calcium compound with the surfaces of said particles.

14. A body as set forth in claim 1 said support structure occupying a small percent of the total volume of said body.

15. A body as set forth in claim 1 said salt-hydrate comprising about 97% of the total volume of said body; and said support structure comprising about 3% of the total volume of said body.

16. A method for fabricating a heat exchange body, including a heat of fusion material, comprising the steps
   preparing a mass of crystalline particles of a salt-hydrate to a generally uniform size;
   preparing a crust forming compound, chosen to react chemically with said crystalline particles to form a water insoluble crust surrounding each particle;
   thoroughly mixing said salt-hydrate particles and said crust forming compound to form a homogenous mixture;
   pouring said mixture into a suitable form;
   allowing said mixture to set in said form, whereby said crust forming compound reacts chemically with the surfaces of said particles to form an integral, rigid, water insoluble crust structure surrounding each of said particles and defining an integral, cellular, support structure for said particles;
   and forming a moisture impermeable outer skin for said body.

17. A method as set forth in claim 16, further comprising
   enclosing said body with a moisture impermeable plastic to provide said outer skin.

18. A method as set forth in claim 17, further comprising
   pouring said mixture into a plastic container fabricated from a moisture impermeable plastic material; and sealing said container to define said moisture impermeable outer skin for said body.

19. A method as set forth in claim 16, further comprising
   preparing said crystalline particles to a uniform size in the range of 0.05 inch to 0.20 inch.

20. A method as set forth in claim 19, further comprising
   preparing said particles to a uniform size of about 0.10 inch.

21. A method as set forth in claim 16, further comprising
   said mass of crystalline particles being prepared from a salt-hydrate selected from a group consisting of the chlorides, nitrates, sulfates, phosphates, and carbonates, respectively, of sodium, potassium, magnesium, aluminum, and iron.

22. A method as set forth in claim 16, further comprising
said crust forming compound being selected from a group consisting of the chlorides, nitrates, oxides, and hydroxides, respectively, of calcium, strontium and barium.

23. A method as set forth in claim 16, further comprising
thoroughly mixing powdered borax with said salt-hydrate particles, in the proportion of about three percent by weight of borax relative to said salt-hydrate particles.

24. A method as set forth in claim 16, further comprising
preparing said crust forming compound in a saturated solution.

25. A method as set forth in claim 24, further comprising
preparing said saturated solution with less than two percent excess water by volume.

26. A method as set forth in claim 24, further comprising
said salt-hydrate being sodium sulfate decahydrate;
said crust forming compound being strontium nitrate;
and said water insoluble crust structure being strontium sulfate.

27. A method as set forth in claim 24, further comprising
said salt-hydrate being sodium sulfate decahydrate;
said crust forming compound being strontium hydroxide;
and said insoluble crust structure being strontium sulfate.

28. A method as set forth in claim 16, further comprising
mixing said crystalline particles with a film forming oil, to provide an oil film surrounding each particle;
preparing said crust forming compound in the form of a powder.

29. A method as set forth in claim 28, further comprising
said film forming oil being oleivc acid.

30. A method as set forth in claim 28, further comprising
said crust forming compound being selected from a group consisting of the hydroxides of calcium, strontium and barium.

31. A method as set forth in claim 30, further comprising
said salt-hydrate being sodium sulfate decahydrate.

32. A method as set forth in claim 16, further comprising
preparing said mass of crystalline particles of a salt-hydrate in the form of a mass of anhydrous granules of the salt of said salt-hydrate, of a selected generally uniform size;
mixing said granules with a moisture permeable film forming oil, to provide an oil film coating each granule;
mixing said coated granules with sufficient water for the crystallization of said granules through said oil film to produce said mass of crystalline particles of uniform size.

33. A method as set forth in claim 32
said film forming oil being oleic acid.

34. A method as set forth in claim 32
preparing said crust forming compound as a water soluble solution.

35. A method as set forth in claim 32
preparing said crust forming compound as a slurry.

36. A method as set forth in claim 16, further comprising
mixing said salt-hydrate particles and said crust forming compound in a proportion that said crust structure occupies a small percent of the total volume of the body.

37. A method as set forth in claim 16, further comprising
mixing said salt-hydrate particles and said crust forming compound in a proportion that said salt-hydrate occupies about 97% of the volume of said body, and said crust structure occupies about 3% of the volume of said body.

* * * * *